US009657856B2

(12) United States Patent
Buckingham

(10) Patent No.: US 9,657,856 B2
(45) Date of Patent: May 23, 2017

(54) REGULATING APPARATUS FOR A PRESSURE ACTIVATED ONE-WAY VALVE

(71) Applicant: O2i Ltd., Port Perry (CA)

(72) Inventor: Robert Buckingham, Uxbridge (CA)

(73) Assignee: O2i Ltd, Ontario (CA)

( * ) Notice: Subject to any disclaimer, the term of this patent is extended or adjusted under 35 U.S.C. 154(b) by 0 days.

(21) Appl. No.: 14/651,559

(22) PCT Filed: May 13, 2014

(86) PCT No.: PCT/CA2014/000422
§ 371 (c)(1),
(2) Date: Jun. 11, 2015

(87) PCT Pub. No.: WO2014/183197
PCT Pub. Date: Nov. 20, 2014

(65) Prior Publication Data
US 2015/0316161 A1    Nov. 5, 2015

Related U.S. Application Data

(60) Provisional application No. 61/824,038, filed on May 16, 2013.

(51) Int. Cl.
*B65D 51/16*  (2006.01)
*F16K 17/02*  (2006.01)
(Continued)

(52) U.S. Cl.
CPC .......... *F16K 17/02* (2013.01); *B65D 51/1644* (2013.01); *B65D 77/225* (2013.01);
(Continued)

(58) Field of Classification Search
CPC   B65D 77/225; B65D 81/263; B65D 81/2076; B65D 2205/00; B65D 51/1644;
(Continued)

(56) References Cited

U.S. PATENT DOCUMENTS 2,097,585 A * 11/1937 Carson .................... A47J 27/09
137/197
2,821,338 A    1/1958 Metzger
(Continued)

FOREIGN PATENT DOCUMENTS

JP    H01279073 A    11/1989

OTHER PUBLICATIONS

International Search Report and Written Opinion from PCT Application Serial No. PCT/CA2014/000422, dated Jul. 22, 2014, 7 pages.
(Continued)

*Primary Examiner* — Mary McManmon
*Assistant Examiner* — David Colon Morales
(74) *Attorney, Agent, or Firm* — Kinney & Lange, P.A.

(57) ABSTRACT

A regulating apparatus for a pressure activated one-way valve. The one-way valve is for mounting on a container to permit the release of gas from within the container and to control the ingress of atmospheric air. The regulating apparatus comprises a sealed and expandable chamber containing a gas. The chamber is operatively associated with the one-way valve such that when the chamber is exposed to elevated temperatures and/or reduced external pressure the gas within the chamber expands and exerts a force upon the one-way valve or portions thereof. The force tends to maintain the one-way valve in a closed or semi-closed configuration.

19 Claims, 5 Drawing Sheets

(51) Int. Cl.
  *F16K 15/14* (2006.01)
  *F16K 15/18* (2006.01)
  *F16K 17/38* (2006.01)
  *B65D 77/22* (2006.01)

(52) U.S. Cl.
  CPC .......... *F16K 15/144* (2013.01); *F16K 15/185* (2013.01); *F16K 17/38* (2013.01); *Y10T 137/1939* (2015.04); *Y10T 137/7879* (2015.04)

(58) Field of Classification Search
  CPC ..... B65D 51/1633; B65D 51/16; F16K 17/02; F16K 15/185; F16K 15/14; F16K 15/144; F16K 17/38; F16K 17/36; Y10T 137/7837; Y10T 137/7876; Y10T 137/7879; Y10T 137/7887; Y10T 137/7889; Y10T 137/7895; Y10T 137/7904; Y10T 137/7905; Y10T 137/1842; Y10T 137/1939; Y10T 137/1987; Y10T 137/1963; Y10T 137/2012
  USPC ................. 383/103, 100; 426/118; 220/203.11–203.18, 203.29, 203.27, 220/203.19, 367.1; 251/94
  See application file for complete search history.

(56) References Cited

U.S. PATENT DOCUMENTS

| | | | |
|---|---|---|---|
| 2,870,954 A | 1/1959 | Kulesza | |
| 2,927,722 A | 3/1960 | Metzger | |
| 2,946,502 A | 7/1960 | Metzger | |
| 2,997,397 A * | 8/1961 | Doulgheridis | B65D 51/16 215/233 |
| 3,369,556 A * | 2/1968 | Allderdice | F16K 49/00 137/236.1 |
| 3,468,471 A | 9/1969 | Linder | |
| 3,637,187 A * | 1/1972 | Burger | F16K 31/1262 251/282 |
| 3,714,958 A * | 2/1973 | Johnson | F16K 19/006 137/315.12 |
| 3,752,175 A * | 8/1973 | Hamilton | A62B 9/027 128/204.29 |
| 3,799,427 A | 3/1974 | Goglio | |
| 3,941,035 A * | 3/1976 | Mueller | F02B 37/186 60/602 |
| 3,949,934 A * | 4/1976 | Goglio | B65D 77/225 137/843 |
| 4,122,993 A | 10/1978 | Glas | |
| 4,134,535 A * | 1/1979 | Barthels | B65D 77/225 137/251.1 |
| 4,206,870 A * | 6/1980 | DeVries | B65D 33/01 137/845 |
| 4,210,255 A * | 7/1980 | Pan | B65D 51/1644 215/260 |
| 4,228,914 A * | 10/1980 | Sanderson | A61L 2/26 206/1.5 |
| 4,253,603 A * | 3/1981 | Johnson | F02C 9/28 137/85 |
| 4,257,449 A * | 3/1981 | Takagi | F16L 25/08 137/505.25 |
| 4,457,327 A * | 7/1984 | Pepper | A61L 2/26 137/67 |
| 4,567,909 A * | 2/1986 | Schebler | B01D 53/0446 137/115.16 |
| 4,598,750 A * | 7/1986 | Gant | B60C 23/003 137/225 |
| 4,890,637 A * | 1/1990 | Lamparter | B65D 77/225 137/246 |
| 5,059,036 A | 10/1991 | Richison et al. | |
| 5,263,777 A | 11/1993 | Domke | |
| 5,275,192 A * | 1/1994 | Lawson | E03B 7/12 137/62 |
| 5,326,176 A | 7/1994 | Domke | |
| 5,394,900 A * | 3/1995 | Okuyama | F02M 69/54 123/463 |
| 5,419,638 A | 5/1995 | Jamison | |
| 5,427,839 A | 6/1995 | Buchner et al. | |
| 5,584,409 A | 12/1996 | Chemberlen | |
| 5,628,849 A * | 5/1997 | Fasano | F27D 5/0037 156/89.12 |
| 5,727,881 A | 3/1998 | Domke | |
| 5,782,266 A * | 7/1998 | Domke | B65D 77/225 137/551 |
| 5,829,884 A | 11/1998 | Yeager | |
| 5,899,218 A | 5/1999 | Dugan | |
| 5,913,326 A * | 6/1999 | Lembser | A62C 2/04 137/77 |
| 5,989,608 A | 11/1999 | Mizuno | |
| 6,182,850 B1 * | 2/2001 | Marbler | B65D 77/225 220/359.3 |
| 6,210,724 B1 * | 4/2001 | Clarke | B65D 77/225 426/106 |
| 6,234,763 B1 * | 5/2001 | Ota | F04B 27/1804 251/61.5 |
| 6,530,391 B1 * | 3/2003 | Dulin | E03B 7/12 137/2 |
| 6,550,495 B1 * | 4/2003 | Schulze | F16K 17/38 137/457 |
| 6,662,827 B1 | 12/2003 | Glougherty et al. | |
| 6,663,284 B2 | 12/2003 | Buckingham et al. | |
| 7,178,555 B2 * | 2/2007 | Engel | B65D 77/225 137/843 |
| 7,243,683 B2 * | 7/2007 | Stotkiewitz | B65D 77/225 137/512.15 |
| 7,244,223 B2 * | 7/2007 | Hartman | B31B 19/84 383/103 |
| 7,299,817 B2 * | 11/2007 | Gisler | B64G 1/286 137/78.5 |
| 7,490,623 B2 * | 2/2009 | Rypstra | B65D 77/225 137/246 |
| 7,604,019 B2 * | 10/2009 | Frampton | A62B 7/14 128/204.29 |
| 7,685,793 B2 * | 3/2010 | Newrones | B65D 33/2508 137/907 |
| 2003/0106589 A1 * | 6/2003 | Basso | B65D 77/225 137/512.15 |
| 2003/0183631 A1 * | 10/2003 | Cross | B65D 51/1644 220/203.17 |
| 2003/0224091 A1 * | 12/2003 | Nayyeri | A23B 9/00 426/118 |
| 2007/0090109 A1 * | 4/2007 | Gustavsson | B65D 77/225 220/203.27 |
| 2011/0084222 A1 * | 4/2011 | Vivian | F16T 1/14 251/61 |
| 2011/0240144 A1 * | 10/2011 | Jung | E03B 7/10 137/468 |
| 2011/0265891 A1 * | 11/2011 | Seline | B65D 77/225 137/511 |
| 2011/0284536 A1 * | 11/2011 | Walters | B65D 77/225 220/203.03 |
| 2012/0025113 A1 * | 2/2012 | Stadelbauer | F16K 31/002 251/11 |
| 2012/0048853 A1 * | 3/2012 | Stadel | B65D 77/225 220/89.1 |
| 2012/0243807 A1 * | 9/2012 | Pascoe | B65D 77/225 383/103 |
| 2012/0298658 A1 * | 11/2012 | Bosetti | B65D 65/466 220/89.1 |
| 2012/0321452 A1 * | 12/2012 | Miranda | F01D 5/082 415/180 |

OTHER PUBLICATIONS

M. Sivetz, et al., "Coffee Technology", © 1979, cover page, copyright page, Table of Contents, pp. 279, 293-297 (9 pages total).

(56) References Cited

OTHER PUBLICATIONS

Pacific Bag Inc., One-Way Degassing Valves, website <http://www.pacificbag.com/index.php/one_way_degassing_valves/valve_tutorial>, 1 page, visited Dec. 22, 2015.
Plitek, Pli-Valv Packaging Degassing System, website <http://www.plitek.com/industries/cofee.asp>, 1 page, visited Dec. 22, 2015.

* cited by examiner

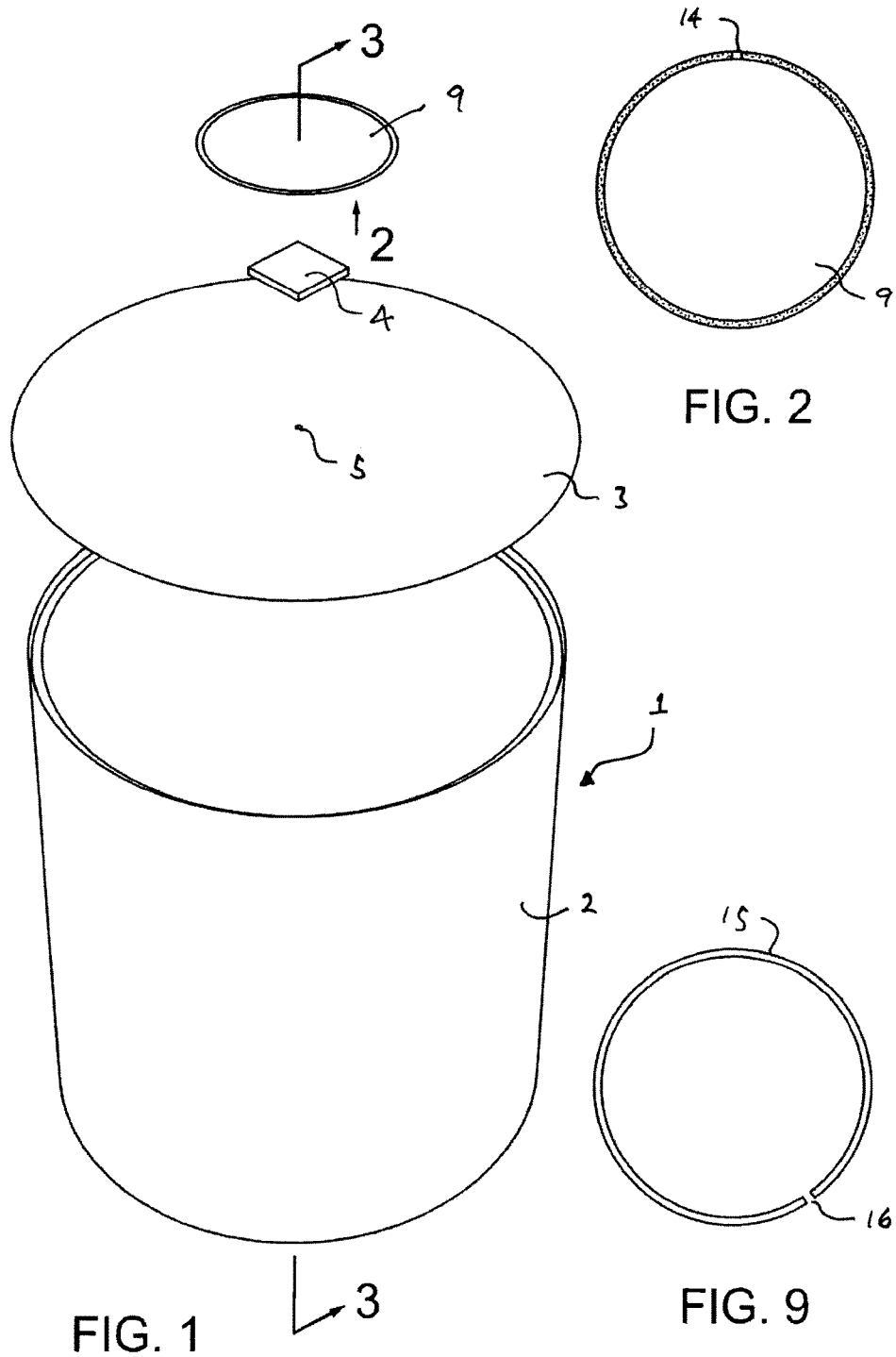

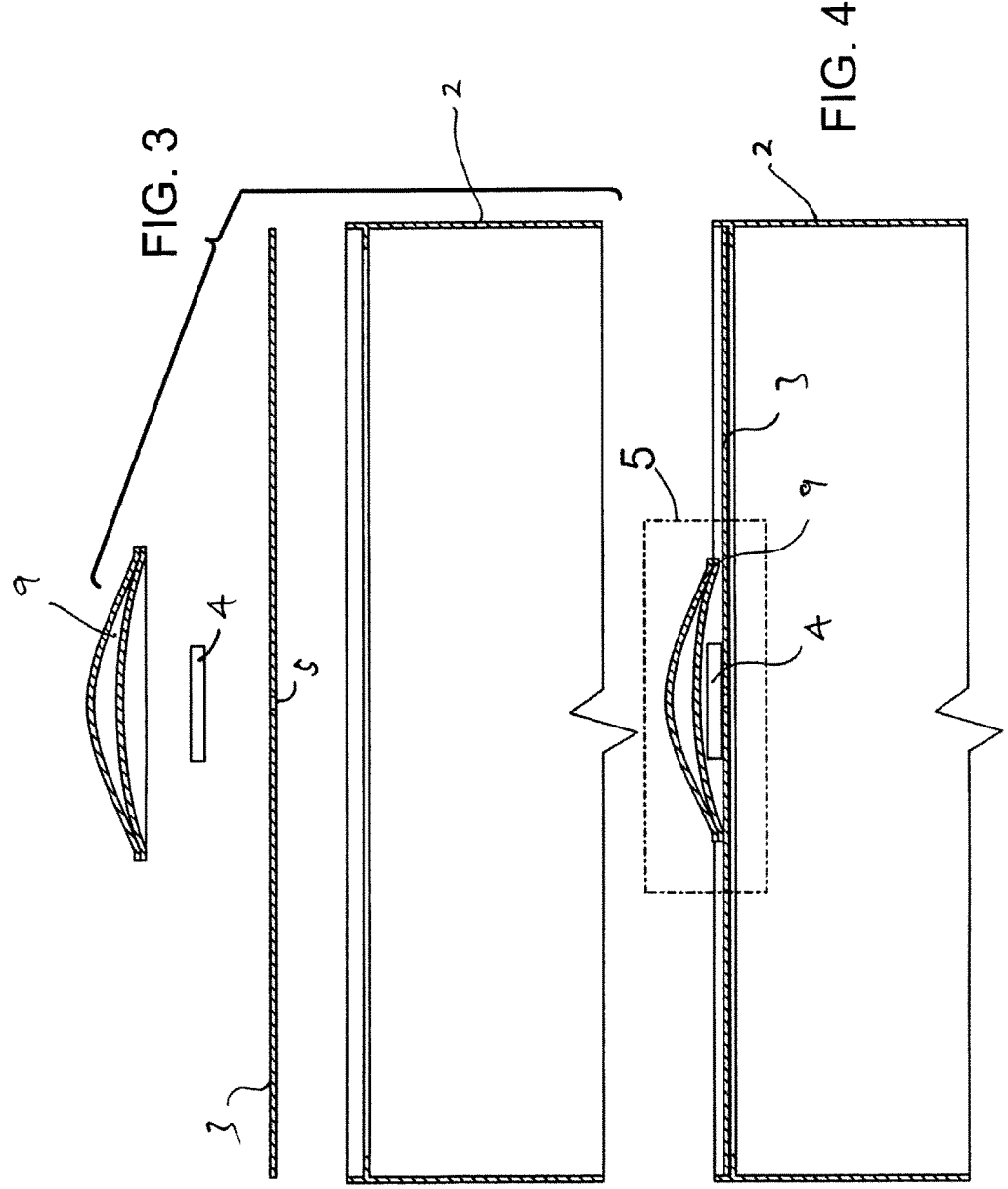

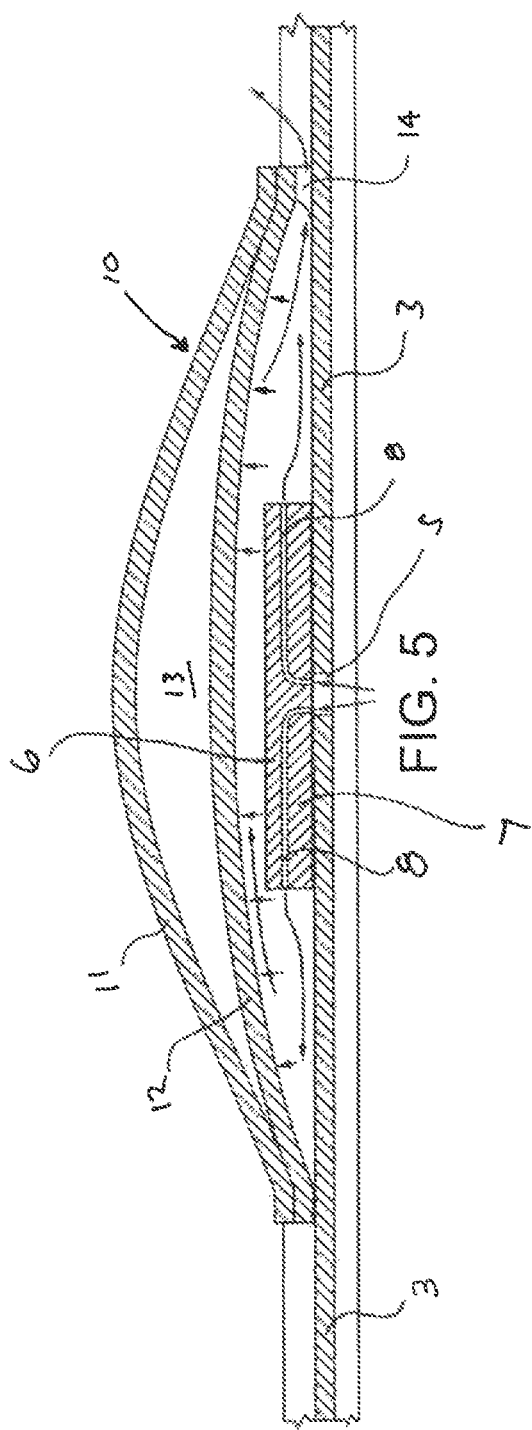
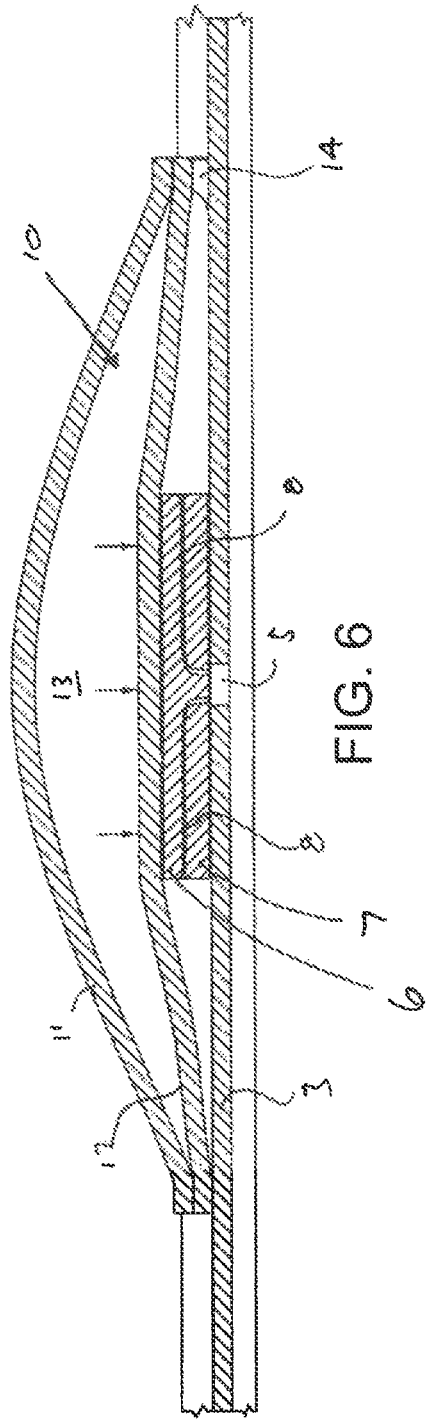

REGULATING APPARATUS FOR A PRESSURE ACTIVATED ONE-WAY VALVE

FIELD

This invention relates generally to the field of pressure activated one-way values of the type that may be used to automatically release gas pressure that builds up within a vessel or container, and in particular to a regulating apparatus for use in association with such one-way valves.

BACKGROUND

A variety of products exhibit a tendency to release or emit gas after they have been placed within a sealed package, container or vessel. For example, roasted coffee beans have a tendency to release carbon dioxide. Some of that carbon dioxide is typically released from the beans after they are placed and sealed within a package or container. Such packages or containers are typically constructed from cardboard, plastic, polyethylene, polyolefin or other materials. As gas is released from coffee beans within the sealed container, the gas pressure builds, resulting in a tendency for the walls of the container to expand outwardly. Depending upon the internal gas pressure and the rigidity and burst strength of the container, the results of building internal gas pressure can range from a simple pressurization of the container, to an expansion of the container walls outwardly, to ultimately a bursting of the container. Where the walls or ends of the container are sufficiently strong to prevent a rupture, the build up of gas causing a bulge or expansion of the container's exterior surfaces makes the container unattractive from the perspective of the consumer, who often equates an expanding container with spoiled product. Containers having walls that have expanded outwardly also present difficulties for retailers who attempt to maximize the use or retail shelf space.

To accommodate the build up and evolution of gases in such circumstances, others have proposed the placement of pressure activated relief valves on the surface of the packaging or container. Initially, pressure activated valves used in applications such as those described above were relatively simplistic in nature and were designed primarily to allow gas built up within the container to be released. The ability for the valve to function as a "one-way" valve to prevent an ingress of air from the exterior environment into the sealed packaging was often somewhat of an incidental feature. However, over time, it became apparent that not only was it desirable to allow the build up of gas within the sealed container to escape, but that it was in many instances important to prevent the ingress of exterior air back through the valve into the container. It was appreciated that the ingress of air into the sealed container would not only introduce oxygen of the container, but that it could also introduce water vapour and/or bacteria and/or spores, etc. that could cause fungal growth or spoilage. As a result, the integrity and ability of such valves to function as one-way valves was enhanced, to the point where valves of relative high integrity were created that would allow for the release of built up pressure with a sealed container, while at the same time preventing or limiting the ingress of atmospheric air back in through the valve and into the interior of the container. An example of such a valve is described in U.S. Pat. No. 6,663,284, dated Dec. 16, 2003.

Unfortunately, as the integrity and effectiveness of one-way valves in the nature of those described above increased, a side effect of their enhanced functionality has become apparent. One such side effect occurs when sealed containers containing such valves are transported under conditions of high temperature and/or low pressure. For example, products that are transported by air freight are typically exposed to low pressures that may be present in the cargo holds of airplanes. Under such circumstances, when the sealed containers are exposed to a low pressure environment during flight, the gas pressure within the containers will exceed that of the surrounding atmosphere, resulting in an expulsion of the gas from within the container through the one-way valve. The expulsion of gas from the container will tend to continue until the interior and exterior pressures have generally equalized. As the airplane descends and the exterior atmospheric pressure increases, the one-way valve on the container tends to close, preventing the ingress of atmospheric air back into the container. By the time that the airplane lands, there can have developed a significant vacuum state within the container. Once again, depending upon the nature of the container's walls, the end result may be a collapsing of the container walls inwardly. Where the walls do not collapse inwardly, the establishment of a vacuum within the container results in an immediate rush of air into the container when it is opened by a consumer. Where a container's walls have collapsed inwardly, the same concerns arise as with the above described case of the container having walls that have expanded. In addition, the sudden rush of air in the container when it is opened that results from the establishment of a vacuum state can have deleterious effects on the product stored therein. For example, in the case of roasted coffee, should a consumer open a package that is in a vacuum state the rush of air in the container when it is opened will expose the coffee to oxygen, which can cause oxidation of the coffee, often giving it a bitter taste.

It will be appreciated that the same vacuum state can be established within containers that are shipped by truck or rail, where the truck or rail car passes through areas of significant elevation changes (for example, mountainous regions). In addition, in situations where product is transported in hot environments, the product could be exposed to elevated temperatures which would have the result of increasing the gas pressure within the containers and forcing gas through the one-way valve. When the environment within which the containers are being shipped returns to a more traditional temperature, the resulting reduction of the gas pressure within the container, in conjunction with the operation of the one-way valve, can establish a vacuum situation.

SUMMARY

The invention therefore provides a regulating apparatus for a pressure activated one-way valve, the one-way valve for mounting on a container to permit the release of gas from within the container and to control the ingress of atmospheric air into the container, the regulating apparatus comprising a sealed and expandable chamber containing a gas, said chamber operatively associated with the one-way valve such that when said chamber is exposed to elevated temperatures and/or reduced external pressure said gas within said chamber expanding and exerting a force upon the one-way valve or portions thereof, said force tending to maintain the one-way valve in a closed or semi-closed configuration.

The invention also provides a regulating apparatus for a pressure activated one-way valve, the one-way valve for mounting on a container to permit the release of gas from within the container and to control the ingress of atmospheric air into the container, the regulating apparatus comprising a sealed and expandable chamber, said chamber comprising a bladder formed from an upper and a lower layer that are sealed about their respective edges to form a sealed cavity therebetween, said cavity containing a gas, at least said lower layer of said bladder formed from an expandably resilient material, said bladder operatively associated with the one-way valve, when said bladder is exposed to elevated temperatures and/or reduced external pressure said gas within said bladder expanding and causing said bladder to exert a force against the one-way valve, said force tending to maintain the one-way valve in a closed or semi-closed configuration Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 1 is an exploded view of an exemplary container that includes a pressure activated one-way valve and an exemplary embodiment of a regulating apparatus in accordance with the present invention;

FIG. 2 is a bottom view of the regulating apparatus shown in FIG. 1, taken from direction 2 as illustrated in FIG. 1.

FIG. 3 is a sectional view taken along the line 3-3 of FIG. 1.

FIG. 4 is a partial side sectional view of the container of FIG. 1 in its assembled state having mounted thereon a pressure activated one-way valve and an embodiment of the regulating apparatus shown in FIG. 1.

FIG. 5 is an enlarged view of portion 5 shown in FIG. 4 demonstrating the operation of the pressure activated one-way valve and the regulating apparatus shown in FIG. 1 under conditions where gas is allowed to escape from the container.

FIG. 6 is a figure similar to FIG. 5 wherein the regulating apparatus prevents the escape of gas through the pressure activated one-way valve.

FIG. 9 is a sectional view of the shim of the regulating apparatus of FIGS. 7 and 8, said sectional view taken along the line 9-9 of FIG. 8.

DESCRIPTION

Figure 7:
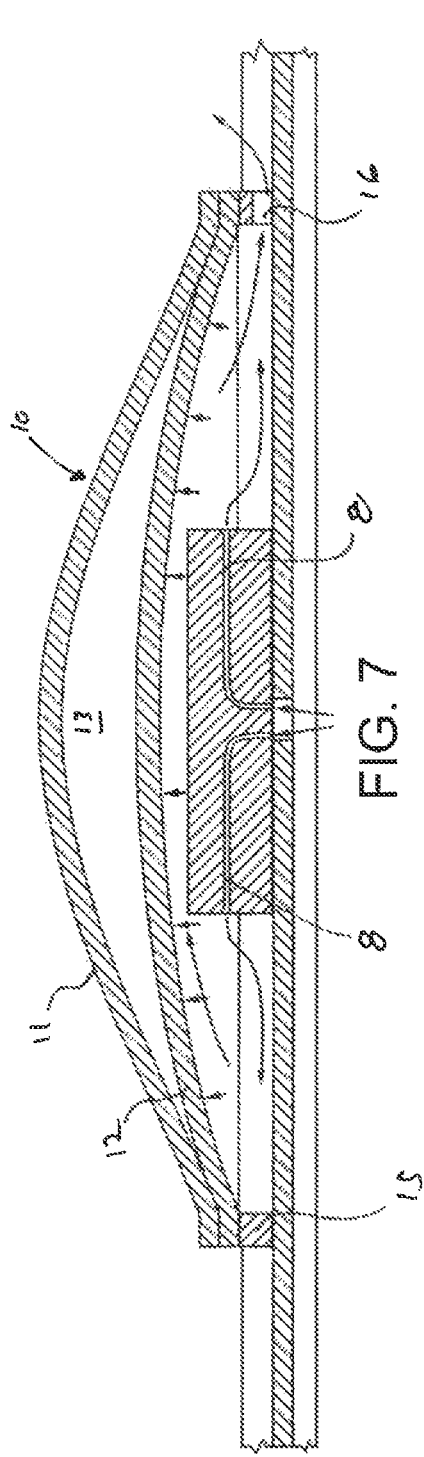
FIG. 7 is a side sectional view similar to FIG. 5 showing an alternate embodiment of the regulating apparatus under conditions where gas is allowed to escape from the container.

The present invention may be embodied in a number of different forms. The specification and drawings that follow describe and disclose some of the specific forms of the invention.

With reference to FIG. 1, there is shown in exploded view an exemplary container 1 having a bottom (not specifically shown), a side surface 2 and a top surface 3. When fully assembled, top 3 will be sealed around its circumference to side surface 2. For illustration purposes container 1 has been shown to be a rigid or semi-rigid cylindrical container. However, it will be appreciated that a wide variety of other containers could equally be used, manufactured from rigid, semi-rigid or flexible materials and having a cylindrical or any one of a wide variety of other geometric shapes or configurations. It should also be appreciated that container 1 can be designed for use in association with a variety of different products. For illustration purposes, the description below will specifically deal with the situation where the container is used to store roasted coffee.

Where container 1 is for use in association with a product that releases or emits gas (such as roasted coffee) the container will typically be fitted with a pressure activated one-way valve 4. In the embodiment shown FIG. 1, valve 4 is located on the top of container 1. It could also be located on other exterior surfaces. In this embodiment, a hole or passageway 5 extends through the top surface 3 of container 1 and allows gas to escape from the interior of the container into the atmosphere. The placement of valve 4 over hole or passageway 5 helps to control the release of gas from the interior of the container, and also helps to prevent the ingress or flow of exterior air back through the valve and into the interior of the container. In the case of roasted coffee, carbon dioxide is often emitted after the coffee has been placed within a container. In such cases once the gas pressure of the carbon dioxide exceeds the ability of the valve to remain closed $CO_2$ is allowed to flow through passageway 5, make its way through valve 4 and escape into the environment. The valve also prevents air from being drawn back into the container so that the coffee does not come into contact with oxygen which could oxidize the coffee and affect its taste.

It will be appreciated by those skilled in the art that such one-way valves are commonly used in the coffee packaging industry for the reasons described. It will also be appreciated that a wide variety of different valves and valve structures have been proposed by others that accomplish the same, or essentially the same, result. A number of such pressure activated one-way valves, which are sometimes referred to as film valves, are formed from a number of layers that create compartments or passageways linking the interior of the container with the exterior environment. One such example of a one-way valve is described in U.S. Pat. No. 6,663,284, dated Dec. 16, 2003.

For illustrative purposes, a simplified embodiment of such a one-way valve is shown in the attached Figures. Here, the valve is comprised of an upper layer 6 and a lower layer 7, having therebetween one or more passageways 8 that connect hole or opening 5 with the exterior environment. Typically, when the gas pressure within container 1 is within an acceptable range, passageways 8 will be in a "closed" configuration, such that gas from inside container 1 is prevented or significantly restricted from escaping and exterior air is prevented or significantly restricted from passing into the container. Maintaining passageways 8 in their "closed" configuration is, in the case of many valves, a function of the layering of the upper layer of the valve over the lower layer. In other instances a considerably more complex valve could be formed containing a labyrinth of passageways that effectively "self-close" under conditions where the pressure within the container is within acceptable limits. Oil or other material may be placed between the layers of the valve in order to enhance the cohesion between the layers and to encourage them to remain in a generally closed configuration.

As gas pressure within container 1 increases (for example with the evolution of $CO_2$ from roasted coffee) eventually the pressure will exceed the ability of one-way valve 4 to remain in a generally closed configuration, at which point the gas will pass through hole or passageway 5, through passageways 8 within the valve and into the exterior environment. Eventually, the gas pressure within container 1 will be reduced to the point where the one-way valve will again return to its generally closed configuration, thereby sealing the gas within the container and preventing the ingress of air.

In accordance with the invention there is provided a regulating apparatus (generally identified as 9 in the attached drawings) that serves to control or "regulate" pressure activated one-way valve 4. Regulating apparatus 9 is located adjacent to one-way valve 4. In its broadest form, regulating apparatus 9 comprises a sealed and expandable chamber that is operatively associated with one-way valve 4. In one particular embodiment the chamber is a bladder 10 that contains a gas such that when the bladder is exposed to elevated temperatures and/or reduced external environmental pressure the gas within the bladder expands causing the bladder to exert a force against one-way valve 4 that tends to maintain the valve in its generally closed configuration. When temperatures are reduced, or the atmospheric pressure increases, the gas within bladder 10 will contract, thereby alleviating the force that is supplied to the one-way valve and permitting the valve to operate as it normally would in the case where regulating apparatus 9 was not present.

Figure 10:
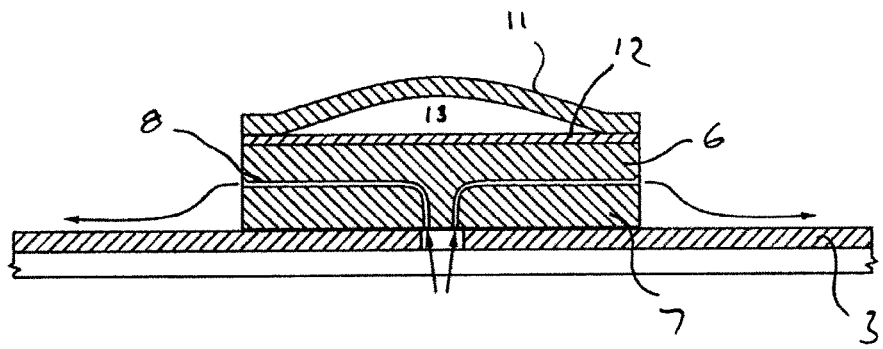
FIG. 10 is a side sectional view similar to FIG. 5 showing a further alternate embodiment where the regulating apparatus is secured directly to the value and gas is allowed to escape from the container.

It will be appreciated by one of ordinary skill in the art that, depending upon the physical size and structure of valve 4, regulating apparatus 9 could be mounted directly to the valve or it could be mounted and fixed to container 1 such that it completely encompasses valve 4. For illustrative purposes, in attached FIGS. 1 through 8 there is shown embodiments of the invention wherein regulating apparatus 9 is larger than one-way valve 4 such that the regulating apparatus is secured directly to container 1 (in this instance top surface 3), completely encompassing valve 4. FIGS. 10 though 12 show alternate embodiments where regulating apparatus 9 is secured directly to the upper surface of valve 4. In all depicted embodiments regulating apparatus 9 is shown as being circular in nature, however, apparatus 9 could equally be any one of a wide variety of other geometric shapes.

With reference to in FIGS. 3 through 6, in one embodiment of the invention bladder 10 is comprised of an upper and lower layer (11 and 12 respectively) that are sealed about their edges to form an internal cavity 13. Cavity 13 is filled with a gas. In most instances it is expected that the gas will be air at a pressure that is at or near sea level atmospheric pressure. Upper and lower layers 11 and 12 are preferably made of an expandably resilient material that will allow the size of the bladder to expand and contract with the expansion and contraction of the gas retained within cavity 13. As shown in the attached Figures, bladder 10 is positioned over one-way valve 4 in a manner that places lower layer 12 of the bladder immediately over the upper surface of the one-way valve. The exterior perimeter of the bladder will be fixed or otherwise fastened to the surrounding surface of container 1 in order to maintain the bladder in position. In most instances it is expected that the bladder will be secured to the container through the use of an adhesive, however, other methods of attachment, including the use of mechanical fasteners and mechanical fastening mechanisms, could also be used while remaining within the broad scope of the invention. A partial list of potential materials from which upper and lower layers 12 and 13 of bladder 10 could be constructed includes polypropylene, bi-axially oriented polypropylene, polyester, latex, polyethylene, polyethylene terephthalate, rubber, nylon, cellulose, ethylene-vinyl acetate, polystyrene, low-density polyethylene, metallocene polyethylene, polytetrafluoroethylene, polyvinyl chloride, soy protein, starch from corn, lactic acids, and metalized films. It will be apparent that it is also possible to construct bladder 10 in a manner such that upper layer 11 is more rigid that lower layer 12. As it is the lower layer that will directly apply force to one-way valve 4 when the gas within internal cavity 13 expands, upper layer 11 could be more rigid than lower layer 12 so that when the bladder expands it is the lower layer that expands outwardly into contact with the upper surface of the one-way valve.

With reference to FIGS. 5 and 6, the functionality of regulating apparatus 9 and how it helps to control the operation of one-way valve 4 will be described in further detail. In FIG. 5 there is depicted a one-way valve 4 placed upon a container 1, wherein the valve has encompassed about it a regulating apparatus 9 constructed in accordance with one of the embodiments of the present invention. Under the conditions depicted in FIG. 5, regulating apparatus 9 is not affecting the operation of the valve 4, which in this instance is shown to be in its open position with gas from within the container passing through hole 5, through passageways 8 and into the space between the surface of the container and the exterior surface of lower layer 12 of bladder 10. Gas that enters that space is allowed to exit into the exterior atmosphere through one or more ports 14 located between apparatus 9 and the surface of container 1. That is, although regulating apparatus 9 is secured by an adhesive or other means of fastening to the surface of container 1, one or more ports or passageways allow for the flow of gas from beneath bladder 10 into the exterior atmosphere. In the case of a container filled with roasted coffee, FIG. 5 demonstrates the operation of one-way valve 4 during conditions of relatively standard temperatures and pressures, wherein $CO_2$ that evolves from the roasted coffee is allowed to flow out through the valve and be eventually released into the atmosphere. Where the gas pressure within the container subsides, valve 4 will return to its generally closed position in a manner consistent with the structure and functionality of the valve, with regulating apparatus 9 having largely no effect.

The condition depicted in FIG. 6 is one which occurs should container 1 be subjected to conditions of elevated temperatures and/or reduced environmental pressures. The elevated temperatures and/or reduced environmental pressures will cause the gas within the internal cavity of bladder 10 to expand, effectively pushing lower layer 12 of the bladder against the upper surface of one-way valve 4 (see arrows in FIG. 6). The force applied by the bladder to the valve in this regard will have the tendency to help maintain the valve in a closed or semi-closed configuration and prevent, limit or restrict the escape of gas from within container 1. That is, as shown in FIG. 6, as the gas within cavity 13 expands, the bladder applies pressure to the one-way valve maintaining passageways 8 generally closed. As the external temperature falls and/or the external pressure increases, the gas within cavity 13 will contract, thereby alleviating the pressure applied by the bladder to the one-way valve and permitting the one-way valve to once again operate as it would in the normal course.

From a thorough understanding of the invention it will be appreciated that not only can regulating apparatus 9 can be "customized" to allow it to apply force to valve 4 only when the environmental temperature and/or pressure has reached a particular level, but that the amount of force applied by regulating apparatus 9 to one-way valve 4 can also be varied. In particular, the "set-off" between lower layer 12 and the upper surface of the valve can be controlled so that the bladder will not come into contact with the valve (and thereby be able to exert a force upon it) until such time as the bladder has expanded to a predetermined degree. The amount and pressure of the gas initially placed within internal cavity 13 can also be varied so that either small or large fluctuations in temperature and/or pressures can have either a small or large effect upon the expansion of bladder 10. For example, if regulating apparatus 9 were constructed such that the gas received within cavity 13 was at a higher pressure that the typical atmospheric pressure that container 1 would be subjected to, there will be a tendency for the bladder to be in a somewhat expanded state from the time of its manufacture. Thereafter, relatively small increases in exterior temperature and/or decreases in exterior pressure would typically have an immediate effect and the bladder would expand. Similarly, if internal cavity 13 were not initially pressurized, or should it be pressurized to a state less than the pressure of the atmosphere to which it is expected to be exposed in the normal course, a somewhat greater increase in temperature and/or a greater decrease in exterior pressure will typically be required in order to significantly expand the bladder, when compared to the level of increase of temperature or the decrease in pressure required to expand the bladder where the internal cavity is initially pressurized as described above.

The flexibility of the material from which the bladder is constructed, the ability of the layers of the bladder to stretch or expand, the geometric shape of the bladder, and the type of gas that is received within internal cavity 13 will also have a bearing upon the rate and the extent that bladder 10 expands when exposed to elevated temperatures or reduced pressures. Any one, or any combination, of these features, along with the "set-off" of the bladder from the upper surface of the valve, could be altered to customize the regulating apparatus for use with any particular one-way valve, or for an expected pressure and/or temperature range to which the container is expected to be subjected.

Figure 8:
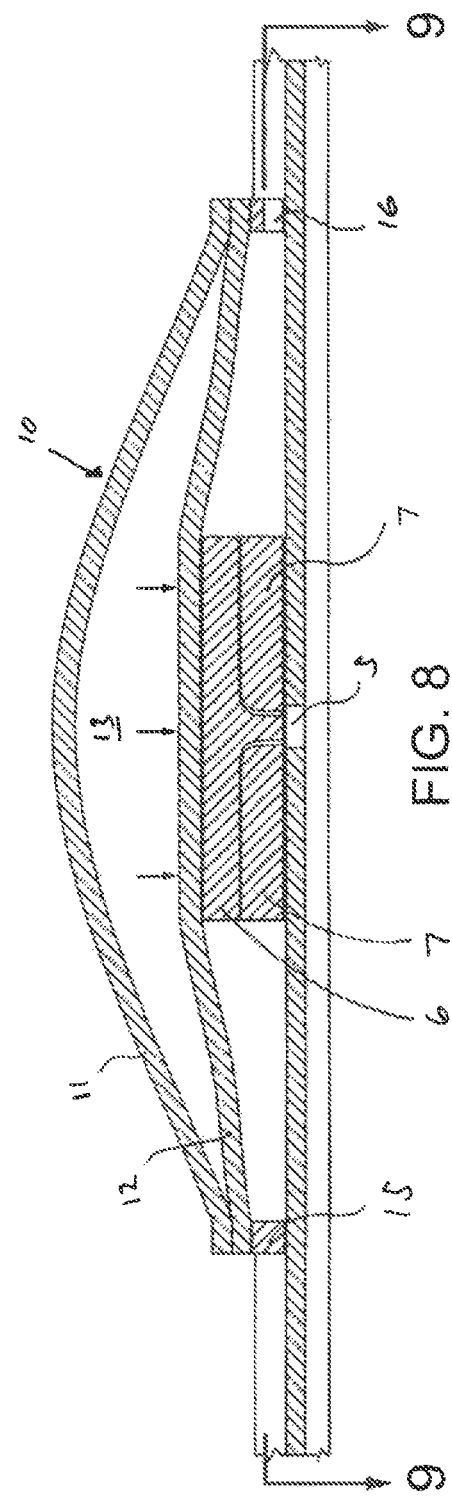
FIG. 8 is a figure similar to FIG. 7 wherein the regulating apparatus prevents the escape of gas through the pressure activated one-way valve.

FIGS. 7 through 9 depict a further embodiment of the invention. Here, regulating apparatus 9 includes a shim 15 that is positioned generally about the circumference of the lower side of the apparatus and that effectively "sets-off" bladder 10 from the upper or top surface 3 of container 1. In this instance, since regulating apparatus 9 is generally circular in plan view, shim 15 is also generally circular. Shim 15 will have at least one passageway 16 extending through it that connects the space between regulating apparatus 9 and the top surface of the container with the exterior environment. By setting-off the lower layer 12 of bladder 10 from the upper surface of the container, shim 15 helps to accommodate a one-way valve 4 that may have a height that would cause the bladder to apply a pressure against the upper surface of the valve, even under circumstances of standard exterior temperatures and pressures. If that were to occur the proper functioning of the valve under normal atmospheric conditions may be undesirably impeded. Further, certain types of one-way valves contain internal chambers that act as bellows, requiring the valves to expand in an upward direction during operation. In such cases the distance between the lower surface of lower layer 12 of bladder 10 and the upper surface of top 3 of container 1 must be sufficient to permit the valve to operate at it is intended when the container is subjected to pressures and temperatures within acceptable limits. The incorporation of a shim within apparatus 9 also permits a larger volume of gas to be utilized within cavity 13.

It will also be appreciated that the vertical height of the shim could be altered as necessary to accommodate different types of valves. Alternately, rather than increasing the height of shim 15 a series of essentially identical shims could be placed on top of one another. Typically, shim 15 would be fastened to lower layer 12 of bladder 10 through the use of adhesive or other fastening member or fastening method. The lower surface of the shim would thereafter be secured to the upper surface of container 1, much in the same manner as regulating apparatus 9 would be secured to the container in the case where no shim is required.

Figure 11:
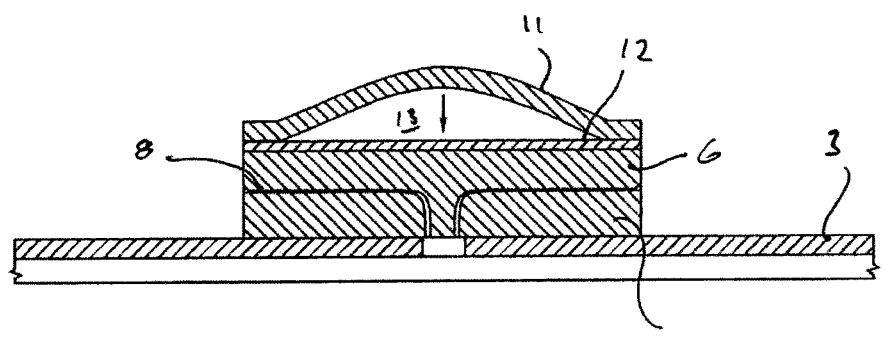
FIG. 11 is a figure similar to FIG. 10 wherein the regulating apparatus prevents the escape of gas through the pressure activated one-way valve.
Figure 12:
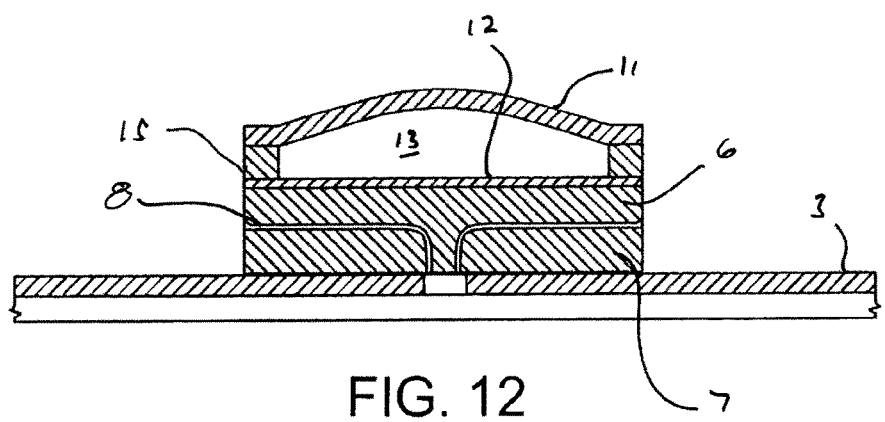
FIG. 12 is a figure similar to FIG. 10 wherein the regulating apparatus includes a shim.

Referring next to the embodiment shown in FIGS. 10 through 12, it should first be noted that the overall general functionality of regulating apparatus 9 in FIGS. 10 through 12 is the same as that of FIGS. 1 through 8. One of the primary differences in the embodiment of FIGS. 10 through 12 is that the regulating apparatus is fixed directly to valve 4 rather than being fixed or secured to the container itself. In the case of FIGS. 10 and 11, lower layer 12 of bladder 10 is positioned immediately over the upper layer 6 of valve 4. It is expected that in most instances the outer circumferential edge of lower layer 12 will be secured to the upper surface of the valve through the use of an adhesive or other fastening means or mechanism. With bladder 10 in such a position, when the container is subjected to standard or "typical" exterior temperatures and/or pressures an increase of gas pressure within the container will allow for the gas to be bled off through valve 4 with the regulating apparatus having essentially no effect upon the valve's operation. FIG. 10 shows such a scenario. When the container is subjected to elevated temperatures or decreased pressures the gas within bladder 10 will expand (see FIG. 11) causing pressure to be exerted against the upper surface of the valve, tending to maintain the valve in a closed or semi-closed configuration.

It will be appreciated that the design considerations described above with respect to the embodiments shown in FIGS. 1 through 8 will generally apply equally to the embodiments shown in FIGS. 10 and 11. That is, regulating apparatus 9 can be "customized" to allow it to apply a desired degree of force against valve 4. Such "customization" can be achieved through varying the size of internal cavity 13, through choice of materials from which upper and/or lower layers 11 and 12 are constructed, through varying the type of gas and the pressure of the gas initially placed within internal cavity 13, or any combination of such features. Further, and as is also the case for the embodiment shown in FIGS. 1 through 8, the upper layer 11 of bladder 10 could be formed from a somewhat more rigid material than lower layer 12 such that as the gas pressure within the bladder increases there is less of a tendency for the upper layer to expand and more of a tendency for the pressure to react in a downward direction to maintain valve 4 in closed or semi-closed configuration.

In a variation of the embodiment shown in FIGS. 10 and 11, if desired lower layer 12 of bladder 10 can be eliminated. In such a case upper layer 11 will be fixed directly to the upper layer 6 of the valve. Internal cavity 13 will thus effectively be formed by upper layer 11 of the bladder and the upper layer 6 of the valve. It will therefore be necessary for a hermetic seal to exist between the upper layer of the bladder and the top surface of the valve. For that reason, in most instances it is expected that the upper layer of the bladder will be secured to the valve through the use of an air-tight adhesive. Through the elimination of lower layer 12 of bladder 10 a cost savings in terms of the amount of material used will be realized and the overall height or thickness of valve 4 and regulating apparatus 9 will be slightly reduced.

FIG. 12 shows yet a further variation to the embodiment shown in FIG. 10. Similar to the embodiment shown in FIG. 7, a shim 15 is positioned generally about the circumference of the lower side of apparatus 9 in order to effectively displace bladder 10 away from the upper surface of the valve. Again, as in the case of the embodiment of FIG. 7, use of shim 15 can help to accommodate valves that contain internal chambers that act as bellows, and also facilitates utilization of a larger amount of gas within the bladder if desired. One of ordinary skill in the art will appreciate that shim 15 could also be incorporated into the embodiment where bladder 10 does not include a lower layer 12. In that embodiment the shim will effectively be positioned between the upper layer of the bladder and the upper layer or upper surface of valve 4. There will in such circumstances be a hermetic seal between the upper layer of the bladder and the shim, and between the shim and the upper layer or upper surface of the valve. In each of the above described embodiments that include a shim, either a single shim could be used or a series of essentially identical shims could be placed on top of one another to achieve the desired effect.

It will further be appreciated that in yet another embodiment of the invention bladder 10 and internal sealed cavity 13 could effectively be formed within the layers of valve 4 itself and not presented as an external add-on feature.

From a thorough understanding of the invention described above and shown in the attached drawings, one of ordinary skill in the art will appreciate that regulating apparatus 9 presents the unique ability to control or regulate the operation of a one-way valve, such as those that are commonly used on containers of roasted coffee. In one version of the invention, fixing the regulating apparatus a desired distance from the surface of the container about the one-way valve permits the valve to function normally under "typical" or acceptable exterior temperatures and pressures. Locating a gas filled bladder or chamber adjacent and above the one-way valve presents a means to apply a force to the valve that helps to maintain the valve in its closed or semi-closed configuration when external temperatures exceed a predetermined level and/or when external pressures fall below a predetermined level. Such a structure advantageously regulates the valve and maintains it in a closed or semi-closed position when the container is transported through high temperature environments, transported by air freight in low pressure environments or transported through high elevation (mountainous) regions having reduced atmospheric pressure. The same functionality can be achieved through alternate embodiments where the regulating apparatus is fixed directly to the top of the one-way valve or where the apparatus is incorporated within the valve itself.

It is to be understood that what has been described are the preferred embodiments of the invention. The scope of the claims should not be limited by the preferred embodiments set forth above, but should be given the broadest interpretation consistent with the description as a whole.

I claim:

1. A regulating apparatus for a pressure activated one-way valve, the one-way valve for mounting on a container to permit the release of gas from within the container and to control the ingress of atmospheric air into the container, the regulating apparatus comprising:
a sealed and expandable chamber having an upper and a lower layer and containing a gas, said chamber operatively associated with the one-way valve such that when the container is exposed to elevated atmospheric temperatures or reduced atmospheric pressure said gas within said chamber expanding and said lower layer contacting the one-way valve exerting a force upon the one-way valve or portions thereof, said force tending to maintain the one-way valve in a closed or semi-closed configuration.

2. The regulating apparatus as claimed in claim 1 wherein said apparatus is mounted to the one-way valve.

3. The regulating apparatus as claimed in claim 1 wherein said apparatus is mounted to the container and encompasses the one-way valve.

4. The regulating apparatus as claimed in claim 3 wherein the juncture between said apparatus and the container upon which it is mounted permits the flow of gas from a point between the container and said apparatus to a point exterior to the container and said apparatus.

5. The regulating apparatus as claimed in claim 4 wherein said apparatus is mounted to the container through the use of an adhesive.

6. The regulating apparatus as claimed in claim 1 fixed to the one-way valve.

7. The regulating apparatus as claimed in claim 1 wherein said chamber is filled with air.

8. The regulating apparatus as claimed in claim 1 wherein said chamber is a sealed and expandable bladder positioned adjacent to the one-way valve.

9. The regulating apparatus as claimed in claim 8 wherein said upper layer and said lower layer are sealed about their respective edges.

10. The regulating apparatus as claimed in claim 1 wherein said upper layer is fixed and hermetically sealed to the upper surface of the one-way valve.

11. The regulating apparatus as claimed in claim 9 further including one or more shims, said one or more shims spacing said bladder a pre-determined distance from the surface of the one-way valve.

12. The regulating apparatus as claimed in claim 9 wherein said upper and said lower layers of said bladder are resiliently flexible.

13. The regulating apparatus as claimed in claim 9 wherein said lower layer of said bladder is resiliently flexible.

14. The regulating apparatus as claimed in claim 9 formed from polypropylene, bi-axially oriented polypropylene, polyester, latex, polyethylene, polyethylene terephthalate, rubber, nylon, cellulose, ethylene-vinyl acetate, polystyrene, low-density polyethylene, metallocene polyethylene, polytetrafluoroethylene, polyvinyl chloride, soy protein, starch from corn, lactic acids, or metalized films.

15. A regulating apparatus for a pressure activated one-way valve, the one-way valve for mounting on a container to permit the release of gas from within the container and to control the ingress of atmospheric air into the container, the regulating apparatus comprising:
a sealed and expandable chamber, said chamber comprising a bladder formed from an upper and a lower layer that are sealed about their respective edges to form a sealed cavity therebetween, said cavity containing a gas, at least said lower layer formed from an expandably resilient material, said bladder operatively associated with the one-way valve, when the container is exposed to elevated atmospheric temperatures or reduced atmospheric pressure said gas within said bladder expanding and causing said bladder to exert a force against the one-way valve, said force tending to maintain the one-way valve in a closed or semi-closed configuration.

16. The regulating apparatus as claimed in claim 15 including one or more shims spacing said lower layer a pre-determined distance from the surface of the one-way valve.

17. The regulating apparatus as claimed in claim 16 wherein said bladder is mounted to the one-way valve.

18. A regulating apparatus for a pressure activated one-way valve, the one-way valve for mounting on a container to permit the release of gas from within the container and to control the ingress of atmospheric air into the container, the regulating apparatus comprising:

a sealed and expandable chamber containing a gas, said chamber operatively associated with the one-way valve such that when the container is exposed to reduced external atmospheric pressure said gas within said chamber expanding and a wall of said chamber transmitting a force to the one-way valve or portions thereof, said force tending to maintain the one-way valve in a closed or semi-closed configuration.

19. The regulating apparatus as claimed in claim 18, wherein an exterior surface of the sealed and expandable chamber is exposed to exterior atmosphere.

* * * * *